United States Patent [19]

von Döhren

[11] 4,125,378
[45] Nov. 14, 1978

[54] VIBRATORY CHEMICAL REACTOR HAVING INSULATION WHICH ACQUIRES AN ELECTROSTATIC CHARGE DURING VIBRATION

[75] Inventor: Hans von Döhren, Ratzeburg-Bäk, Fed. Rep. of Germany

[73] Assignee: Varta Batterie Aktiengesellschaft, Fed. Rep. of Germany

[21] Appl. No.: 837,925

[22] Filed: Sep. 29, 1977

[30] Foreign Application Priority Data

Oct. 7, 1976 [DE] Fed. Rep. of Germany ....... 2645185

[51] Int. Cl.² .......... B01J 8/16; C04B 35/10; C04B 35/16; C04B 43/00
[52] U.S. Cl. .......... 422/202; 252/62; 106/75; 106/122
[58] Field of Search .......... 23/252 R; 252/62; 106/75, 122; 34/164; 432/134

[56] References Cited

U.S. PATENT DOCUMENTS

| | | | |
|---|---|---|---|
| 3,497,455 | 2/1970 | Ahr | 106/122 |
| 3,950,259 | 4/1976 | Pallo et al. | 252/62 |
| 3,974,315 | 8/1976 | Murata | 106/122 |
| 4,035,151 | 7/1977 | Czerny et al. | 23/252 R |
| 4,069,284 | 1/1978 | Niimi et al. | 106/75 |

*Primary Examiner*—Morris O. Wolk
*Assistant Examiner*—Bradley Garris
*Attorney, Agent, or Firm*—Weiser, Stapler & Spivak

[57] ABSTRACT

The mantle of a vibratory spiral reactor is filled with powdery material for insulation which acquires an electrostatic charge during vibration, thereby providing air spaces and resisting compaction during operation of the reactor.

8 Claims, 1 Drawing Figure

U.S. Patent
Nov. 14, 1978
4,125,378
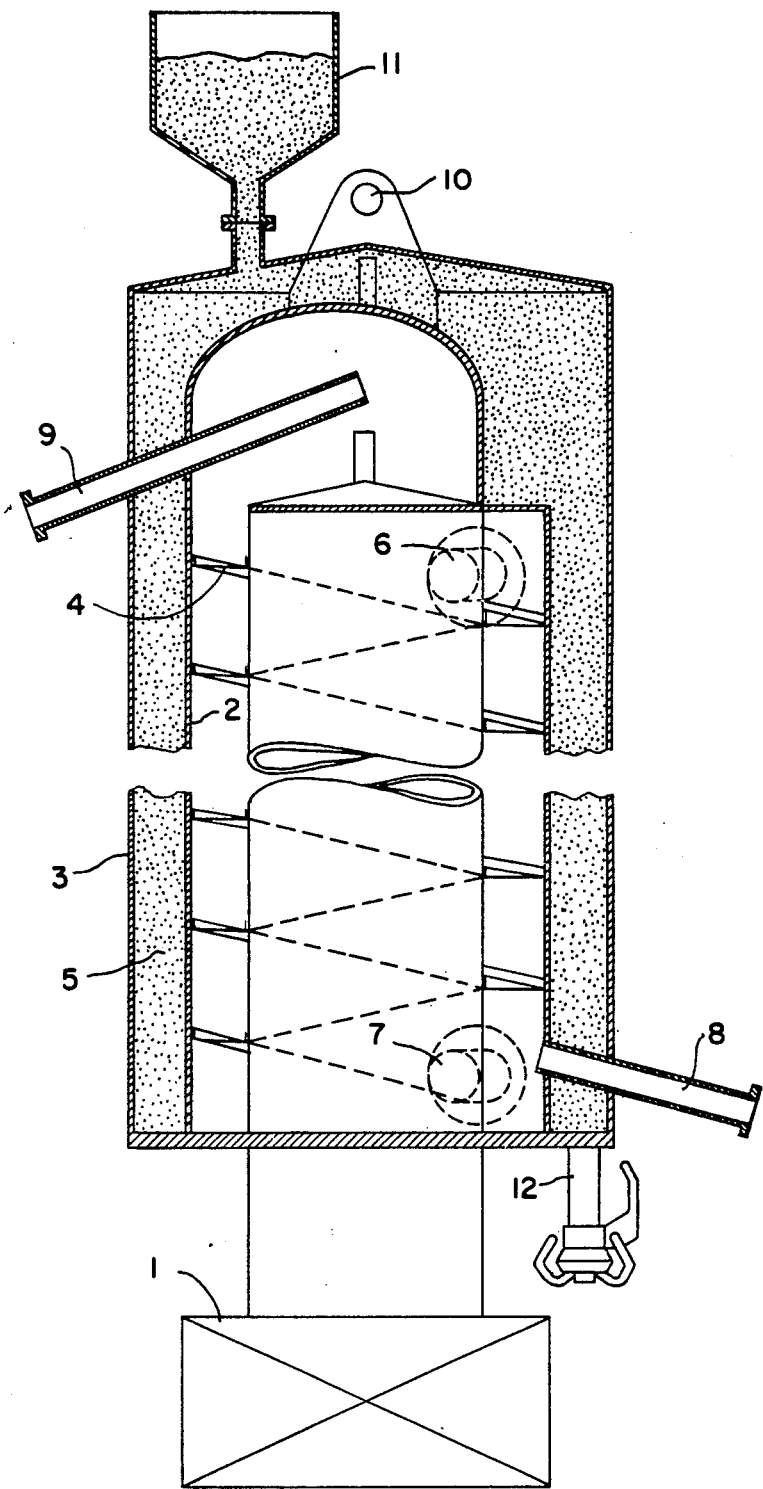

VIBRATORY CHEMICAL REACTOR HAVING INSULATION WHICH ACQUIRES AN ELECTROSTATIC CHARGE DURING VIBRATION

The invention relates to a vibratory chemical reactor having an enclosure containing a heat flow impeding material.

In carrying out chemical processes which take place within closed reaction vessels and require the supply of heat, heat insulation of the container against the external surroundings is necessary in order to keep the energy consumption within economic limits and in order to use the heat generated in the course of the reaction to a large extent for self-heating of the system.

A particularly effective heat flow impedance for the reaction vessel is desired when the reactants, e.g. the components of a synthetic gas, remain within it only for the duration of the interaction, or when gaseous products are created through heat absorbing decomposition processes involving catalyst contact by means of which heat is continually withdrawn from the reactor.

A chemical reactor of particular type, in the form of a vibratory spiral conveyor with gas-tight enclosure, is disclosed in German patent publication (DT-OS) No. 2,403,998 and corresponding U.S. Pat. No. 4,035,151. It is used for interaction between gaseous and solid material, the latter being transported along a spiral path with the aid of the vibratory movement of the reactor downwardly through the reaction zone. A preferred field of utilization of this reactor is in the production of catalysts, particularly of hydrated catalysts for fat-rendering. Silicate beads are proposed for the sound and heat flow impedance in this known reactor.

A particularly efficient insulator is a vacuum. However, because of technological considerations, this cannot be used in the present application. Equally unuseable are organic insulating materials due to the high operating temperatures of the reactor at about 500° C., even through in general these are poorer heat conductors than the inorganic insulators.

Since the determining criterion for the performance of a heat flow impedance is its coefficient of heat conductivity, expressed in kilo-calories per meter hour degree (kcal/m.h.deg.), which should be as low as possible, air is also an excellent insulator. However, the generally favorable insulating effect of air layers can be adversely affected because possible convection and particularly radiation increases the heat transmission. This disadvantage can be counteracted by filling the air space defined by two parallel walls, i.e., the mantle of the reactor, with a powder- or fiber-like material or by producing a porous material of appropriate thickness techniques such as expansion, foaming, etc. Such porous material exhibits a low coefficient of heat conductivity, whose value moreover also depends upon other parameters, such as the nature and arrangement of the pores, chemical and molecular structure of the solid components, moisture, etc.

Because of the complex configuration of the insulator, consisting of air pores and solid filler, its coefficient of heat conductivity has an intermediate value between that of air and that of the solid components. Within predetermined limits a decrease in the coefficient of heat conductivity, and therefore improved insulating effect, may be expected if it is possible to increase the proportion of pore volume, i.e., to reduce the volumetric weight. In this context, volumetric weight is to be understood as being the weight of the body including the pore spaces.

As inorganic fillers for the heat insulation of the reactor mantle, there have already been utilized among other things silicate beads, glass wool and rock wool. These always involve more or less strongly networked silicate structures or, in the case of rock wool, an inorganic fibrous material. The latter particularly should have low compressability and a volumetric weight which is favorable from the insulating standpoint.

In operating a vibratory reactor it has been found that the heat flow impeding materials utilized have the disadvantage that the vibration causes rubbing together of the individual fibers. After short operating periods the glass wool or rock wool filler has therefore disintegrated into a fine powder. Consequently, the reactor mantle does not remain filled uniformly with impeding material and this also leads to displacements in the center of gravity of the reactor. Furthermore, tight packing increases the heat conduction to the exterior, i.e., the heat insulation declines. Since fresh insulating material must be introduced into the mantle thereafter, the weight of the heat flow impeding material rises. For powdery materials such as silicate beads, the vibration causes agglomerating which also creates the above-described disadvantages.

Accordingly, it is a primary object of the invention to provide a heat flow impeding material for a vibratory chemical reactor which does not clump under the influence of the vibration and is also not destroyed by mechanical rubbing, and yet possesses excellent heat flow impeding properties combined with low weight.

This and other objects which will appear are accomplished in accordance with the invention by utilizing a heat flow impeding material which is stable with temperature, water free, and powder-like, and whose particles are electrostatically charged with respect to the surrounding gaseous medium so that the initial compaction density of the material is maintained during operation.

Particularly suitable materials are annealed technical aluminum oxides, or thermally produced silicon dioxides, or air precipitated silicate beads. It has been surprisingly found that when such materials are used they acquire a charge in response to the vibration which prevents agglomeration of the powder filler. Aluminum oxides acquire positive charges in this process, silicon dioxide of the above-described type acquires a negative charge. Silicon dioxides or silicate beads produced by other chemical processes do not possess this desirable property. This can be attributed to the fact that they still possess hydrate groups, i.e., always have adhering to them a thin layer of moisture which precludes electrostatic charging. Materials of this type which are rendered hydrophobic also do not exhibit the inventive effect.

In practical experiments, it has been found that an air precipitated silicate bead filler embodying the invention exhibits a volumetric loss of only about 1 to 2 percent during 3-months long operation, and that aluminum oxides exhibit a volumetric loss of only 4 to 5 percent. In contrast, if glass wool or silicate beads are used the volume during the same period shrinks to between one half and one third of the initial volume. With rock wool as the filler the reactor is no longer operable after only 5 weeks. Moreover, use of the materials embodying the invention impede the heat flow appreciably more strongly. This is attributable to the fact that the individual particles do not contact each other because of their electrostatic charge. Rather, air is present as a good heat insulator between the particles. There is also achieved a favorable low volumetric weight which does not change even in response to heat load fluctuations.

The average size of the primary particles should be as small as possible, or rather should conform to the requirement that the individual grain is not so heavy that its electrostatic charge is insufficient to support that grain. Particularly preferred are therefore average primary particle sizes of about 10 to 30 millimicrons, and especially about 10 to 20 millimicrons. In selecting the material, the BET surface of the powder is also to be particularly taken into account. This should be as high as possible, preferably between about 10 and 30 $m^2/g$, and especially between about 170 and 250 $m^2/g$.

If two materials embodying the invention are known to acquire electrostatic charges of opposite polarities, then a mixture of the two should not be used because, as shown through experiments, these break down in a manner similar to materials which tend to compact.

For further details, reference is made to the discussion which follows, in light of the accompanying drawing wherein:

The single FIGURE illustrates a vibratory-spiral conveyor embodying the invention.

Referring to the drawing, this represents diagrammatically a vibratory-spiral conveyor of the type shown in the above-mentioned German patent publication and U.S. patent. The reactor is actuated through an oscillating magnet or eccentric motor 1. It includes a gas-tight enclosure in the form of two concentric hollow cylinders 2 and 3, in whose interior the spiral chutes 4 are positioned. The mantle is filled with heat flow impeding material 5 embodying the invention. The supply and removal connections for the powder to be processed in the reactor are designated by reference numerals 6 and 7, respectively. The gas supply and gas outlet is designated by reference numerals 8 and 9, respectively. The above-mentioned reactor is suspended by means of an eye 10 from an elastic support (not shown).

It is particularly desirable to provide a storage container of heat impeding material, e.g. in the form of funnel 11, connected to the mantle containing the heat impeding material. This has the purpose of enabling fresh heat impeding material to slide in, in conformity with operating requirements. It has been found that when the vibratory-spiral conveyor is stopped, the electrostatic charge of the individual particles leaks off so that additional material flows from the storage container or funnel 11 into the enclosure. However, upon renewed operation, a pumping action takes place which causes the major portion of the additional insulating material which has flowed in to again be forced back into the storage container. Pipe nipple 12 can be used to empty the heat flow impeding material out of the mantle.

I claim:

1. A vibratory chemical reactor having an enclosure containing a heat flow impeding material with a predetermined compaction density wherein
   the heat flow impeding material is temperature stable, water free, and powdery, and
   the particles of said material are electrostatically charged relative to the surrounding gaseous medium when subjected to vibrations from said reactor,
   whereby the predetermined compaction density of the material is maintained during operation of the reactor due to the electrostatic charge carried by said particles.

2. The reactor of claim 1 wherein
   the heat flow impeding material is thermally produced powdery aluminum oxide.

3. The reactor of claim 1 wherein
   the heat flow impeding material is positioned within a double-walled mantle surrounding the reaction area of said reactor and
   further comprising a storage container for the heat flow impeding material connected to the space within the double-walled mantle.

4. The reactor of claim 1 wherein
   the heat flow impeding material consists of thermally produced air precipitated silicate beads.

5. The reactor of claim 4 wherein
   the air precipitated silicate beads have an average primary particle dimension of about 10 to 30 millimicrons.

6. The reactor of claim 5 wherein
   the air precipitated silicate beads have an average primary particle dimension of about 10 to 20 millimicrons.

7. The reactor of claim 5 wherein
   the air precipitated silicate beads have a BET surface of about 100 to 300 $m^2/g$.

8. The reactor of claim 7 wherein
   the air precipitated silicate beads have a BET surface of about 170 to 250 $m^2/g$.